United States Patent Office 3,341,587
Patented Sept. 12, 1967

3,341,587
PROCESS FOR THE PREPARATION OF
N-ACETYL-P-AMINOPHENOL (APAP)
Bernard F. Duesel, Yonkers, and Godfrey Wilbert, Carmel, N.Y., assignors to Nepera Chemical Co., Inc.
No Drawing. Filed Oct. 15, 1964, Ser. No. 404,150
6 Claims. (Cl. 260—562)

The invention of the present application for United States Letters Patent is a continuation-in-part application based on copending application, Serial. No. 180,317, filed March 16, 1962, now abandoned.

This invention relates to an improved method for the commercial preparation of N-acetyl-p-aminophenol. More particularly, the present invention relates to an improved method for the direct acetylation of p-aminophenol formed by catalytic reduction of certain nitrophenols while in an acetic anhydride reaction solvent such that excellent yields of high purity N-acetyl-p-aminophenol are readily obtained.

N-acetyl-p-aminophenol is a known compound widely used as an analgesic and anti-pyretic agent in various therapeutic compositions. To date the principal methods for preparing N-acetyl-p-aminophenol include reduction processes wherein aromatic nitro compounds are reduced by electrolytic, chemical or catalytic processes. One known method for preparing N-acetyl-p-aminophenol is that disclosed by Tingle et al. in the American Chemical Journal (volume 37, page 51, 1907). The Tingle et al. method prepares p-acetylaminophenol directly from p-nitrophenol by using tin and acetic acid. A number of disadvantages are evident, however, in this method in that complex tin salts from which must then be removed by a laborious purification procedure while the incomplete removal of these tin salts results in a contaminated product, unsuitable for pharmaceutical use. A further disadvantage in preparing acetylaminophenol by the method of Tingle et al. is that an excessive quantity of tin metal is necessary for carrying out the chemical reduction thereby making the process generally uneconomical. Although other reducing agents are also known for use in similar processes for preparing acetylaminophenol, contamination of the reaction mixture results such that subsequent purification becomes necessary which materially adds to the cost of preparation.

Gaseous hydrogen, available at relatively low cost, is commonly employed as a reducing agent in many chemical reactions. While hydrogen may have been used heretofore in the reduction of p-nitrophenol, no solvent system was known such that p-aminophenol could be prepared in pharmaceutically pure yields by a method which does not require extensive purification procedures. One typical example of such a process is that disclosed by Freifelder in U.S. Patent No. 3,076,030 wherein acetyl-aminophenol is prepared by the simultaneous catalytic reduction and acetylation of nitrophenols to N-acetyl-aminophenol. Palladium is employed in this process as the reduction catalyst with at least one mole equivalent of acetic anhydride. Acetic acid is preferably employed in the process as a diluent.

In order to meet the high purity standards for pharmaceutical uses, acetylaminophenols are usually extensively purified by a method such as is disclosed, for example, by Hahn et al. in U.S. Patent No. 3,042,719. Since great competition for the sale and preparation of acetylaminophenol exists in industry, even a slight reduction in savings such as may result from elimination of complex purification procedures contributes materially to marketing advantages.

It has now been found that N-acetyl-p-aminophenol may be obtained efficiently and economically, and in a more highly purified form by a process of the present invention which does not require complex separation and purification procedures.

It is an object of this invention, therefore, to provide a simple and efficient method for the preparation of N-acetyl-p-aminophenol.

It is also an object of this invention to provide a method having commercial application for the preparation of acetylaminophenols wherein acetic anhydride is employed both as the acetylating medium and as the reaction solvent medium.

It is a further object of this invention to provide a method for the preparation of high purity N-acetyl-p-aminophenol which does not require elaborate purification procedures.

It is a specific object of this invention to provide a process for the preparation of high purity N-acetyl-p-aminophenol wherein p-nitrophenol or p-nitrosophenol is catalytically reduced in an acetylation solvent to p-aminophenol which is then simultaneously acetylated in the acetylation solvent without prior isolation from the mother liquor.

Other objects and advantages of this invention will appear from the following detailed description.

Generally, the present invention provides a method for cataytically reducing p-nitrophenol or p-nitrosophenol to p-aminophenol in an acetic anhydride solvent medium and further to simultaneously acetylating the p-aminophenol so formed to n-acetyl-p-aminophenol. The N-acetyl-p-aminophenol as isolated from the reaction medium is found suitably pure for direct pharmaceutical application without need for further purification.

In the present process, it is preferred to add the acetic anhydride to the reaction medium as a two-part addition. Initially, about 0.8 part by weight to about 1.2 parts by weight of acetic anhydride as based on the total amount by weight of either p-nitrophenol or p-nitrosophenol being reacted is added to a closed reaction chamber. Thereafter, the chamber is filled with hydrogen and the reaction is carried out under a regulated temperature between about 70° C. and about 100° C., a regulated temperature in the range of about 80° C. to about 90° C. being preferred. After the reaction has proceeded such that the theoretical quantity of hydrogen has been absorbed, the reaction mixture is cooled to about room temperature whereupon a further addition of acetic anhydride is made in an amount of about 0.15 part by weight to about 0.25 part by weight as based on the total amount by weight of either p-nitrophenol or p-nitrosophenol originally reacted. After the further addition of acetic anhydride, the reaction mixture is heated again to temperatures in the range of about 70° C. to about 100° C. or preferably to about 80° C. to about 90° C. to complete the acetylation.

Distilled water may desirably next be added after the acetylation step is completed in an amount of about 0.5 part by weight to about 1.2 parts by weight as based on the total amount of acetic anhydride added for the purpose of making the reaction product easier to handle during subsequent processing. After the water has been added, the catalyst is filtered from the reaction mass, desirably while warm to prevent premature crystallization and the filtrate is recovered. N-acetyl-p-aminophenol may then be removed from the filtrate by crystallization.

The catalytic reduction can be effected, for example, by employing a relatively small amount such as from 0.05% to about 5% by weight of palladium on carbon as the catalyst. Platinum oxide is also found to be an effective catalyst for use herein. At the conclusion of the reduction reaction, the catalyst may be recovered and may be used again, as desired, for subsequent preparations. Since the present process eliminates the necessity for isolation and purification of p-aminophenol prior to acetylation, a saving of an expensive step is thereby eliminated. Of even greater significance is the fact that the present process is carried out in one step. Furthermore, by virtue of the instantaneous conversion from unstable p-aminophenol to the stable acetylated form in acetic anhydride, the compound prepared by the process of this invention is found to be virtually free from contaminating by-products. One common source for contaminating by-products occurs in processes which employ acetic acid as the reaction solvent. In such processes, involvement of acetic acid in the mechanism of reaction leads to formation of undesirable 4-acetaminophenyl acetate which must then be separated from the desired N-acetyl-p-aminophenol.

The reaction of the present process can be carried out at temperatures in the range of, for example, about 70° C. to about 100° C. with temperatures within the range of about 80° C. to about 90° C. being preferred, at hydrogen pressures of less than about 60 lbs. gauge. Although higher pressures necessitate special equipment, such processes may also be employed in the present process as may pressures down to but greater than atmospheric pressure. Preferably, a pressure in the range of about 10 to about 50 lbs. gauge is found desirable.

The production costs of the present process are substantially reduced because the required fuel costs are low and the use of a special high pressure reaction vessel is generally considered unnecessary. The yields of the N-acetyl-p-aminophenol prepared by the novel process herein described are of the order of about 87% to about 95% as based on the p-nitrophenol employed. This yield may be increased by adjusting the pH of the filtrate to a pH between about pH 5 and about pH 7 to recover a second crop of product but in view of the high yield originally obtained, such further processing is generally not considered to be essential.

In order further to illustrate this invention, but without being limited thereto, the following examples are given:

*Example 1*

A 500 gallon autoclave is charged with 350 lbs. of p-nitrophenol followed by 297 lbs. of acetic anhydride. The vessel is purged with nitrogen and a slurry of 770 gms. of 5% palladium on carbon is added. Under a hydrogen pressure of 40–60 lbs. per square inch gauge, the charge is reacted in the nitrogen purged autoclave at 80–90° C. The theoretical quantity of hydrogen is readily absorbed within about 10 hours. Thereafter, the remaining unreacted hydrogen in the system is vented and the vessel is again purged with nitrogen. To complete the acetylation, 56 lbs. of acetic anhydride is added without further cooling and the mixture heated rapidly to a temperature of about 80–90° C., while making due allowance for the exothermic reaction which takes place. After about two hours the reaction mass is cooled to about 50° C. whereupon 35 gallons of water, preferably demineralized, is added and the mass heated again to about 90° C. In order to prevent coloration of the product, 100 gms. of sodium hydrosulfite may be added to the water diluted-reaction mixture. After the addition of water, the reaction mixture is filtered at about 75°–80° C. in a filter press to remove the catalyst. Thereafter, the batch is cooled to 0°–5° C. for at least 4 hours to precipitate crystals from the solution. The product crystals recovered either by filtration or decantation are found to be substantially pure N-acetyl-p-aminophenol. If desired, the mother liquor from the batch may be neutralized cold to a pH of about 6.5 whereupon a second crop of crystals are recovered. The recovered crystals may then be washed free from color and acetic acid with water. The yield is found to be about 90% of theoretical.

*Example 2*

The procedure of Example 1 is repeated using 318 lbs. of p-nitrosophenol in place of p-nitrophenol. On cooling the filtrate to about 5° C., a white precipitate of substantially pure N-acetyl-p-aminophenol crystallizes out of the filtrate and is worked up as described in Example 1. A yield of about 88% is found to result.

*Example 3*

The similar catalytic reduction is conducted as described in Examples 1 and 2 by employing platinum oxide as the hydrogenation catalyst in place of palladium on carbon. Comparable results are realized.

It is to be understood that the above detailed description is given merely by way of illustration and that many variations may be made therein without departing from the spirit of this invention.

What is claimed is:
1. A process for the preparation of N-acetyl-p-aminophenol consisting essentially of:
   (A) reducing a member of the group consisting of p-nitrophenol and p-nitrosophenol at a temperature in the range of about 70° C. to about 100° C. with gaseous hydrogen in an acetic anhydride reaction medium containing a hydrogenation catalyst,
   (B) adding acetic anhydride to the reaction medium after the reduction of step (A),
   (C) reheating the system to a temperature in the range of about 70° C. to about 100° C.,
   (D) filtering the reaction medium to recover the catalyst, and
   (E) cooling the filtrate whereby N-acetyl-p-aminophenol crystallizes therefrom.

2. A process for the preparation of N-acetyl-p-aminophenol consisting essentially of:
   (A) reducing a member of the group consisting of p-nitrophenol and p-nitrosophenol at a temperature in the range of about 70° C. to about 100° C. with gaseous hydrogen in an acetic anhydride reaction medium containing a hydrogenation catalyst,
   (B) adding to the reaction medium after the reduction of step (A) from about 0.15 part by weight to about 0.25 part by weight of acetic anhydride as based on the weight of said p-nitrophenol and p-nitrosophenol originally reacted,
   (C) reheating the system to a temperature in the range of about 70° C. to about 100° C.,
   (D) adding water to the reaction medium,
   (E) filtering the reaction medium to recover the catalyst, and
   (F) cooling the filtrate whereby N-acetyl-p-aminophenol crystallizes therefrom.

3. A process according to claim 1, wherein said hydrogenation catalyst is palladium on carbon.

4. A process according to claim 1, wherein said hydrogenation catalyst is platinum oxide.

5. A process according to claim 1, wherein said reaction medium of step (A) and step (B) is heated to a temperature in the range from about 80° C. to about 90° C.

6. A process according to claim 1, wherein the filtrate obtained from step (E) is treated to adjust the pH to a range between pH 5 and pH 7.

References Cited

UNITED STATES PATENTS

| | | | |
|---|---|---|---|
| 3,042,719 | 7/1952 | Hahn et al. | 260—562 |
| 3,076,030 | 1/1963 | Freifelder | 260—562 |
| 3,079,435 | 2/1963 | Freifelder et al. | 260—562 |

OTHER REFERENCES

Burckhalter et al.: Jour. Amer. Chem. Soc., vol. 70, pages 1363–73 (1948).

Weygand: Organic Preparations, pp. 12–15, New York, Interscience, 1945.

WALTER A. MODANCE, *Primary Examiner.*

N. TROUSOF, *Assistant Examiner.*